US010953905B2

(12) United States Patent
Tse

(10) Patent No.: US 10,953,905 B2
(45) Date of Patent: Mar. 23, 2021

(54) GOLF CART DRIVE UNIT, GOLF BAG CART

(71) Applicant: Prominent Industrial (Guangzhou) Co. Ltd., Guangzhou (CN)

(72) Inventor: Alex Chi Bun Tse, Hong Kong (HK)

(73) Assignee: PROMINENT INDUSTRIAL (GUANGZHOU) CO. LTD.

( * ) Notice: Subject to any disclaimer, the term of this patent is extended or adjusted under 35 U.S.C. 154(b) by 382 days.

(21) Appl. No.: 15/878,266

(22) Filed: Jan. 23, 2018

(65) Prior Publication Data
US 2018/0208226 A1 Jul. 26, 2018

(30) Foreign Application Priority Data

Jan. 23, 2017 (CN) .......................... 201720086915.8

(51) Int. Cl.
B62B 5/00 (2006.01)
A63B 55/60 (2015.01)
B62B 3/10 (2006.01)

(52) U.S. Cl.
CPC .............. *B62B 5/005* (2013.01); *A63B 55/61* (2015.10); *B62B 3/106* (2013.01); *B62B 5/004* (2013.01); *B62B 5/0053* (2013.01); *B62B 5/0076* (2013.01); *B62B 2202/404* (2013.01); *B62B 2301/05* (2013.01)

(58) Field of Classification Search
CPC ....... B62B 5/005; B62B 5/004; B62B 5/0053; B62B 5/076; B62B 2301/05; B62B 3/106; A63B 55/61
USPC .......................................................... 180/6.5
See application file for complete search history.

(56) References Cited

U.S. PATENT DOCUMENTS 2,896,315 A * 7/1959 Dubberke ............. B60B 27/065
29/428
4,106,583 A * 8/1978 Nemeth .................. B62B 1/045
180/65.6
(Continued)

FOREIGN PATENT DOCUMENTS

GB 2430921 A * 4/2007 ........... B62B 5/0026
WO WO1998/045154 10/1998
WO WO2017/068316 4/2017

OTHER PUBLICATIONS

International Searching Authority (ISA/EP), International Search Report, International Application No. PCT/GB2016/000190, dated Jan. 4, 2017.
(Continued)

*Primary Examiner* — Jacob D Knutson
(74) *Attorney, Agent, or Firm* — Hinshaw & Culbertson LLP

(57) ABSTRACT

A kit for motorizing a golf bag cart, a motorized golf bag cart, and a method of motorizing a golf bag cart are disclosed herein. The kit can include brackets having clamps, a golf cart drive unit, and a remote control. Each bracket is used to replace a rear wheel assembly of a non-motorized golf bag cart. The clamps are used to attach the golf drive unit to the cart. The remote control is used to control and steer the cart via the attached golf cart drive unit. The golf cart drive unit includes two motors, two axles, two wheels and an axle aligning member. The axles slide relative to the axle aligning member to accommodate golf bag carts having different rear wheel spacing.

18 Claims, 10 Drawing Sheets

(56) References Cited

U.S. PATENT DOCUMENTS

| | | | |
|---|---|---|---|
| 4,936,634 A * | 6/1990 | Stratton | B60B 27/0026 |
| | | | 301/111.03 |
| 4,979,582 A | 12/1990 | Forster | |
| 5,232,065 A | 8/1993 | Cotton | |
| 5,375,673 A | 12/1994 | McCall et al. | |
| 5,633,544 A * | 5/1997 | Toida | B60K 7/0007 |
| | | | 180/65.1 |
| 5,657,828 A * | 8/1997 | Nagamachi | B60L 50/52 |
| | | | 180/19.3 |
| 5,839,528 A | 11/1998 | Lee | |
| 5,944,132 A | 8/1999 | Davies et al. | |
| 6,276,470 B1 | 8/2001 | Andreae, Jr. et al. | |
| 6,390,216 B1 * | 5/2002 | Sueshige | B60L 50/66 |
| | | | 180/65.51 |
| 2008/0143174 A1 * | 6/2008 | Burkett | B60B 35/14 |
| | | | 301/126 |

OTHER PUBLICATIONS

International Searching Authority (ISA/EP), International Search Report, International Application No. PCT/EP98/02047, dated Aug. 31, 1998 (English Abstract Only).

\* cited by examiner

GOLF CART DRIVE UNIT, GOLF BAG CART

CROSS-REFERENCE TO RELATED APPLICATION

This application claims priority of Chinese application number CN201720086915.8, filed on Jan. 23, 2017, the entire specification of which is incorporated by reference.

FIELD OF THE INVENTION

The field of the invention relates to golf generally. More particularly, the invention is directed to a golf bag cart, a drive unit for the golf bag cart and a method of motorizing a golf bag cart.

BACKGROUND

Carrying a golf bag with a set of golf clubs and golf balls over an entire golf course can be tiring for many people. Consequently, many golfers buy a golf bag cart, which is easier than carrying one's golf bag but still fatiguing and fatigue can affect a player's ability to accurately strike a golf ball for distance. Employing a human caddy to carry one's golf bag is expensive and often not practical as such caddies are not always available. Therefore, there is a need for a better way to transport one's golf bag over a course while playing golf.

Many golfers already own golf bag carts but find them fatiguing. At the same time, they appreciate the exercise of walking, and riding in a golf cart eliminates most of the distance one would otherwise walk when playing golf. Consequently, a need exists for making existing golf bag carts less fatiguing.

Motorized golf bag carts are known but such carts are often very heavy and difficult to put into a car. Non-motorized golf bag carts are capable of being folded compactly are generally not too heavy allowing them to be placed into the trunk of a car relatively easily. Therefore, a need exists for a better motorized golf bag cart, especially one that is compact and can be transported easily and is sufficiently light in weight to allow a person to place the cart in the trunk of a car relatively easily.

SUMMARY OF THE INVENTION

In one aspect of the invention, a golf bag drive kit for propelling a golf bag cart having a frame, a cradle adapted to hold a golf bag for containing a set of golf clubs, the cradle attached to the frame, and a front wheel attached to the frame is provided. The golf cart drive kit includes a golf cart drive unit comprising first and second axles having first and second axes, respectively; first and second opposed wheels rotatable around the first and second axes, respectively; a first electrical motor for driving one of said wheels and having a first rotor rotatable around the first axis; a second electrical motor for driving the other of said wheels and having a second rotor rotatable around the second axis; and an alignment member attached to the first and second axles and located between the first and second wheels. The alignment member aligns the first and second axles.

Preferably, the alignment member includes a channel into which the first and second axles extend allowing for adjustment of the distance between the first and second wheels. Preferably, the kit has a housing containing the channel, a battery in the housing and wiring electrically connected to the first and second motors for supplying electrical power from the battery, the wiring extending within the first and second axles and within the channel.

Preferably, the first axle has a keyway along the length of the axle and the keyway has a plurality of openings spaced along the length of the keyway. Preferably, the fit also includes a key having an opening and substantially matching the keyway, the key and keyway being fastenable by a fastener passing through the key opening and one of the keyway openings.

Preferably, the golf cart drive unit is capable of steering the golf bag cart by differential rotation of the first and second wheels by the first and second motors, respectively. Preferably, the first and second motors are in the first and second wheels, respectively.

Preferably, the kit has a first bracket for attachment to the frame and to the first axle. The first bracket has opposed clamping surfaces and the first axle has two clamping surfaces to which the bracket attaches. The bracket clamping surfaces substantially match the first axle clamping surfaces. Preferably, at least one of the first axle clamping surfaces has a non-circular portion. The kit may also include a second bracket for attachment to the frame and to the first axle. The second bracket has opposed clamping surfaces and the second axle has two clamping surfaces to which the bracket attaches. The second bracket clamping surfaces substantially match the second axle clamping surfaces. Preferably, at least one of the second axle clamping surfaces has a non-circular portion.

The kit may also include a remote control in wireless communication with the golf cart drive unit for controlling the golf cart drive unit.

In another aspect of the invention, a motorized golf bag cart is provided. The golf bag cart has a frame, a cradle adapted to hold a golf bag for golf clubs or irons, the cradle attached to the frame, a front wheel attached to the frame and a golf cart drive unit. The golf cart drive unit has (1) first and second axles having first and second axes, respectively, (2) first and second opposed wheels rotatable around the first and second axes, respectively, (3) a first electrical motor for driving one of said wheels and having a first rotor rotatable around the first axis; (4) a second electrical motor for driving the other of said wheels and having a second rotor rotatable around the second axis; and (5) an alignment member attached to the first and second axles and located between the first and second wheels. The alignment member aligns the first and second axles, which are attached to the frame.

Preferably, the golf bag cart has a control for instructing the golf cart drive unit to move the golf bag cart forward a distance selected at the control. Each of the first and second motors includes a rotor and a plurality of Hall effect sensors for sensing the rotation of the rotor, The golf cart drive unit determines the distance traveled by the rotation of the rotors sensed by the Hall effect sensors.

Preferably, the first and second motors are in the first and second wheels, respectively. Preferably, the golf bag cart also has first and second brackets attached to the frame. Each of the first and second brackets has opposed clamping surfaces and is attached to the respective first and second axles. Both the first and second axles have two clamping surfaces to which the respective bracket attaches. The bracket clamping surfaces substantially match the respective axle clamping surfaces. Additionally, at least one of the first axle clamping surfaces may have a non-circular portion.

In another aspect of the invention, a method of motorizing a golf bag cart having (1) a frame, (2) a cradle adapted to hold a golf bag for golf clubs or irons, the cradle attached to the frame, and (3) a front wheel attached to the frame is provided. The method includes attaching first and second brackets to the frame and attaching a golf cart drive unit to the cart to the first and second brackets. The golf cart drive unit has (1) first and second axles having first and second axes, respectively, (2) first and second opposed wheels rotatable around the first and second axes, respectively, (3) a first electrical motor for driving one of said wheels and having a first rotor rotatable around the first axis; (4) a second electrical motor for driving the other of said wheels and having a second rotor rotatable around the second axis; and (5) an alignment member attached to the first and second axles and located between the first and second wheels. The alignment member aligns the first and second axles.

Preferably, the frame has mounting holes for attaching two non-motorized rear wheels and the attaching first and second brackets includes fastening the first and second brackets to the frame by the mounting holes. The method may also include detaching the non-motorized rear wheels from the cart before the fastening of the first and second brackets.

Preferably, the attaching of the golf cart drive unit includes attaching the first and second axles to the first and second brackets. The attachment may be direct or indirect. The method may also include sliding the first and second axles outwardly relative to the alignment member so that the first and second wheels are spaced outwardly of the first and second brackets, respectively.

In some embodiments, the wheels of the golf drive unit are fixed to axle (i.e., rotate with axle) and in other embodiments the wheels are not so fixed. In some embodiments, the alignment member is internal to both axles or external to both.

DETAILED DESCRIPTION OF THE INVENTION

Figure 1:
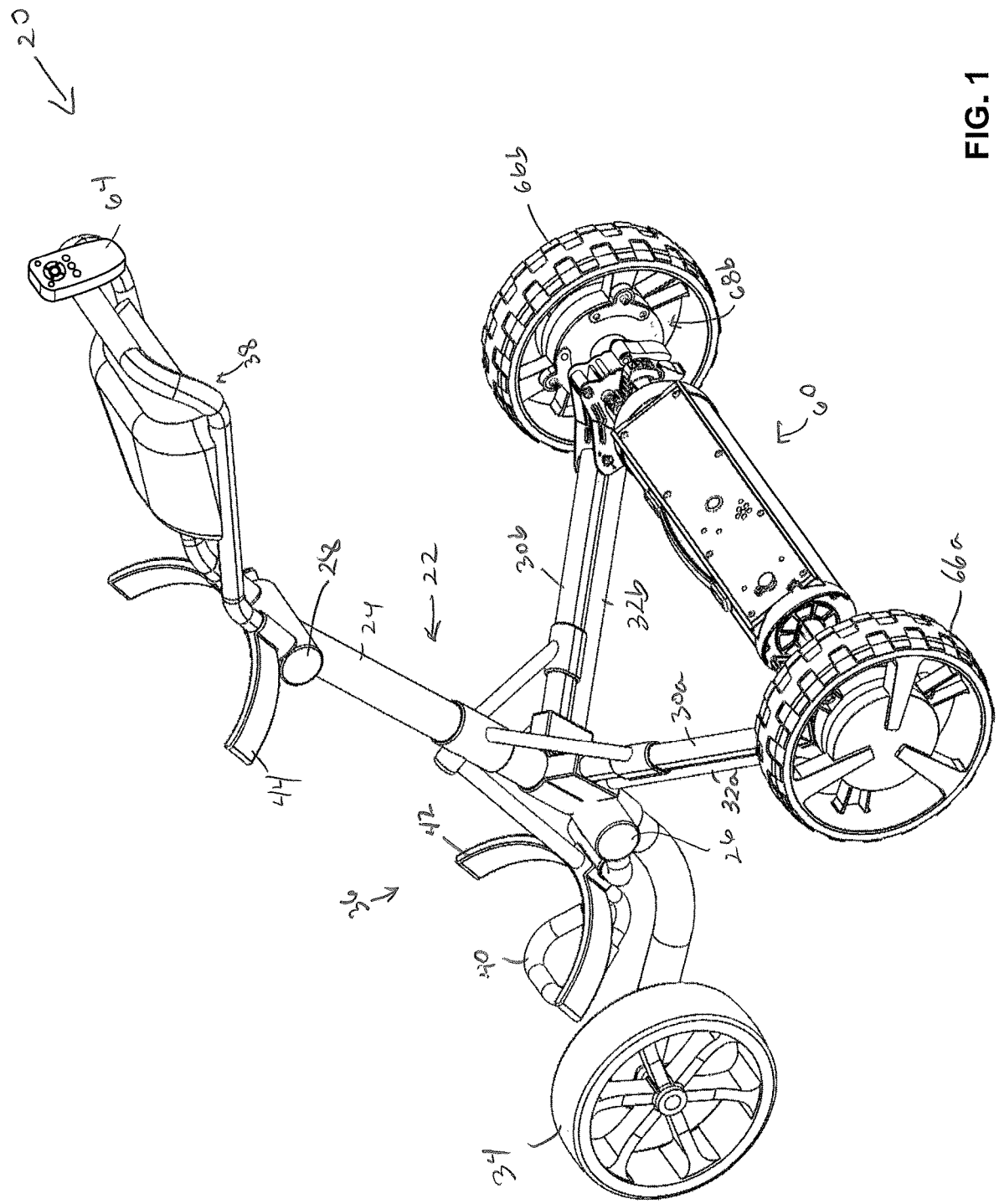
FIG. 1 is a perspective view of a golf bag cart motorized with a golf cart drive kit.
Figure 3:
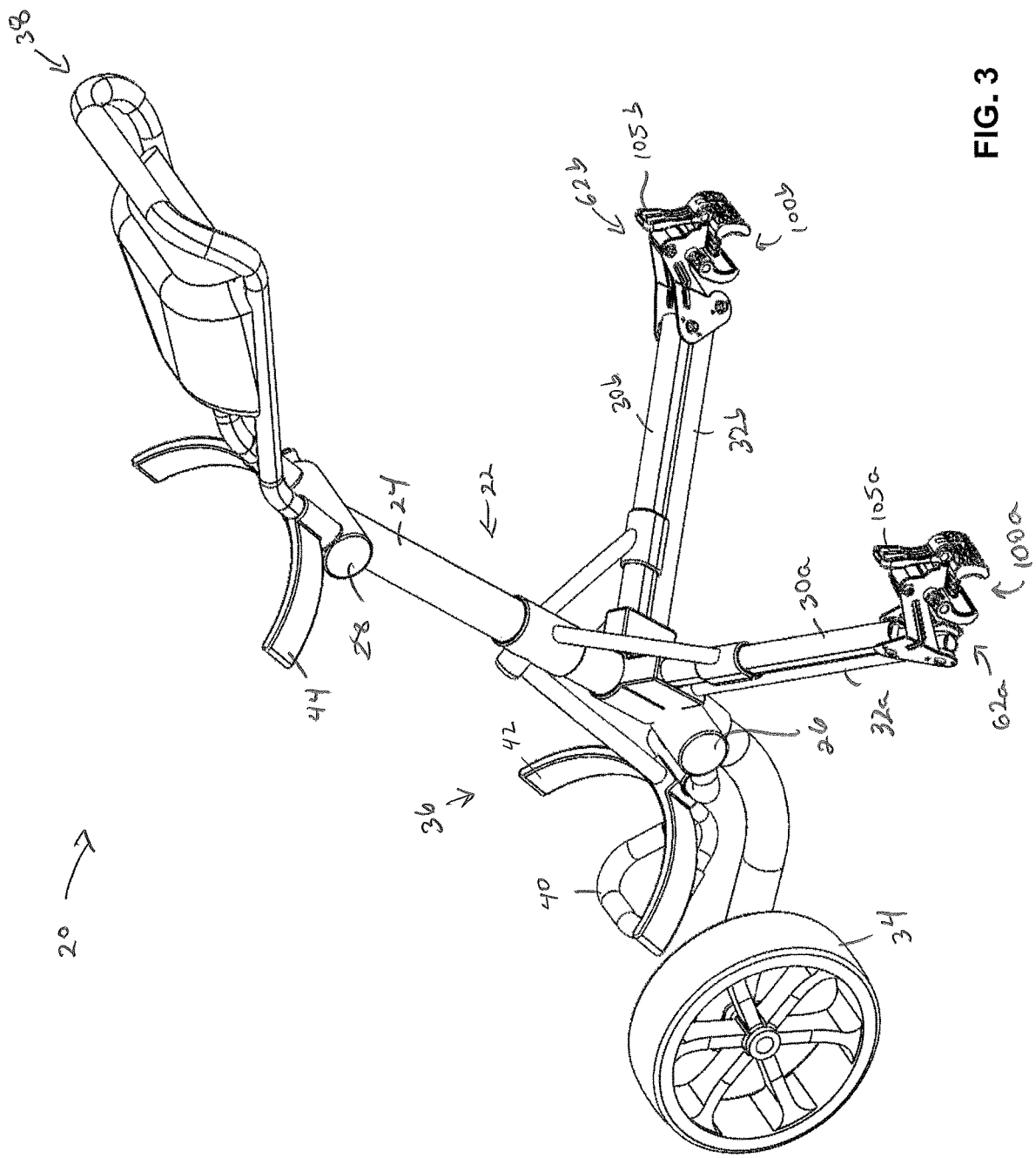
FIG. 3 is a perspective view of the golf bag cart of FIG. 2 partially converted.

A golf bag cart 20 in accordance with the present invention is described herein with respect to FIGS. 1 and 3. Cart 20 has a frame 22 having a central frame member 24, optionally having one or more pivots 26 and 28, and one or more opposed pairs of rearwardly and outwardly extending frame members 30 and 32, which may also be pivotally attached to central frame member 24. Frame 22 is readily collapsible because of pivots 26 and 28 to better fit inside the trunk of a car.

Golf bag cart 20 also has one or more front wheels 34, a cradle 36 for carrying a single golf bag, and a handlebar 38. Front wheel 34 is attached proximal to the lower end of frame 22. Cradle 36 is attached to frame 22 and includes a bottom support 40, and one or more lateral support members 42 and 44. Cradle 36 is used to attach a golf bag for golf clubs or golf irons to cart 20. Support members 42 and 44 may support or be attached to one or more straps for holding the golf bag. Support members 42 may instead be straps. Golf bag cart 20 lacks any seating or any place or structure for transporting passengers. Indeed frame 22 may not be sufficiently robust to support a person weighing more than 125 pounds, never mind a golf bag with a complete set of clubs including woods, irons, putter and the person.

Figure 2:
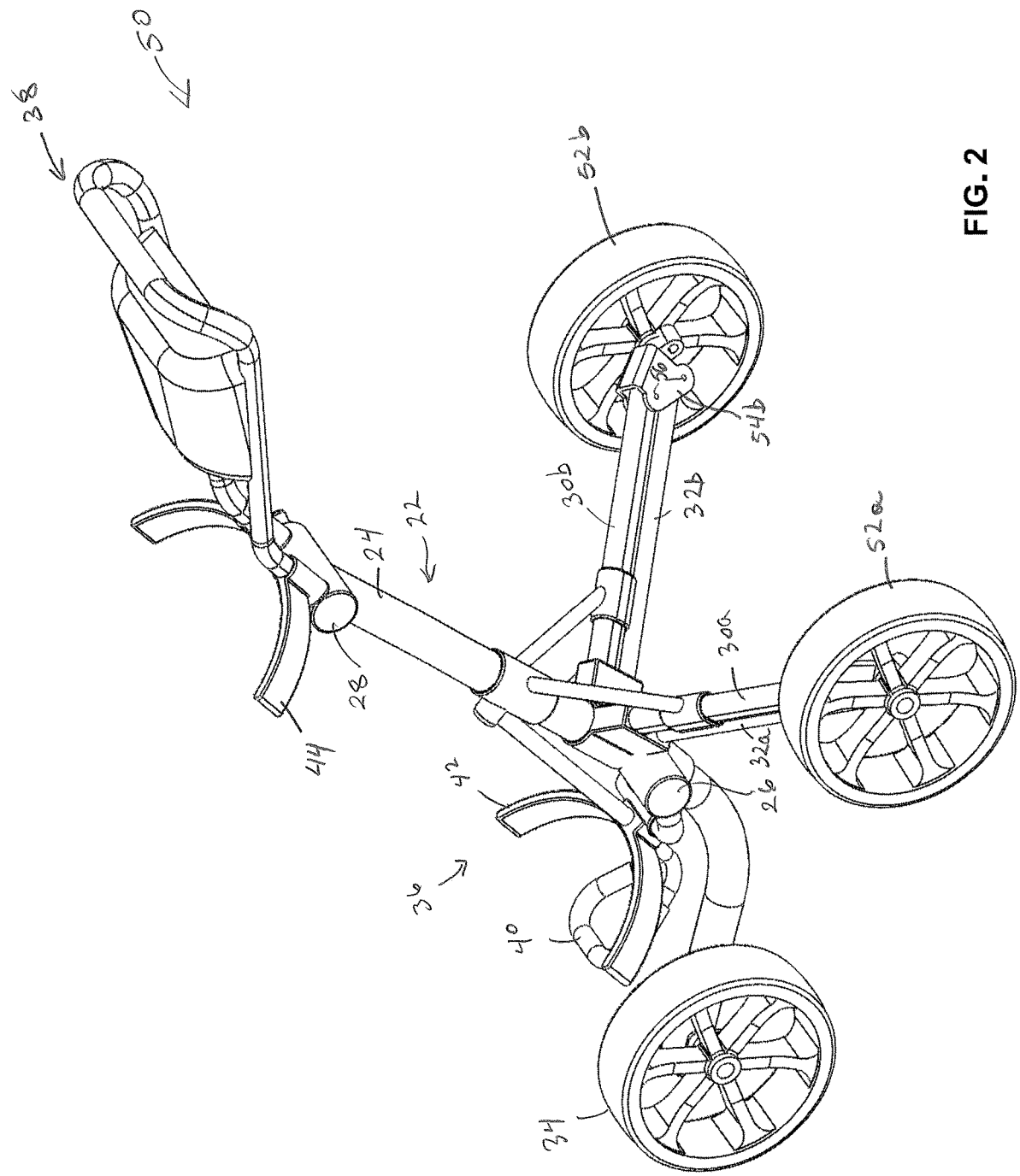
FIG. 2 is a perspective view of a golf bag cart ready to be converted into the motorized golf bag cart of FIG. 1.

In FIG. 2, a conventional non-motorized golf bag cart 50 is illustrated. Cart 50 is a non-motorized form of golf cart 20, which is not part of the invention. Cart 50 has non-motorized wheels 52 attached by brackets 54 to frame members 30 and 32. Preferably, brackets 54 are bolted to frame members 30 and 32 by bolts 56 passing through each of the frame members. Generally, non-motorized cart 50 can be any conventional push-type golf bag cart.

Turning back to golf bag cart 20 of the present invention, cart 20 has a golf cart drive unit 60, two brackets 62 for attaching unit 60 to frame 22, and a remote control 64 for controlling unit 60. Each of these three parts will be discussed in greater detail below.

Golf cart drive unit 60 will now be discussed with particular reference to FIGS. 1, 4-6 and 8. Golf cart drive unit 60 has two opposed wheels 66a and 66b, two motors 68a and 68b, two axles 70a and 70b, and a central control unit 72. Wheels 66a and 66b are driven respectively by motors 68a and 68b to rotate around the longitudinal axes of axles 70a and 70b. Preferably, axles 70a and 70b have substantially the same longitudinal axis. Wheels 66a and 66b may be fixed to axles 70a and 70b, respectively, so that they rotate with axles 70a and 70b; in which case, motors 68a and 68b are advantageously located within central control unit 72. In the illustrated embodiment, wheels 66a and 66b rotate around axles 70a and 70b, respectively, motors 68a and 68b are located in wheels 66a and 66b, respectively, but not necessarily the entirety of motors 68a and 68b, and motors 68a and 68b are mounted respectively to axles 70a and 70b. Motors 68 are preferably brushless and DC motors. Motors 68a and 68b each have a stator fixed to respective axles 70a and 70b and a rotor attached to wheels 66a and 66b. Each of motors 68 has a plurality of Hall effect sensors for sensing the rotation of the rotor versus the stator.

Figure 4:
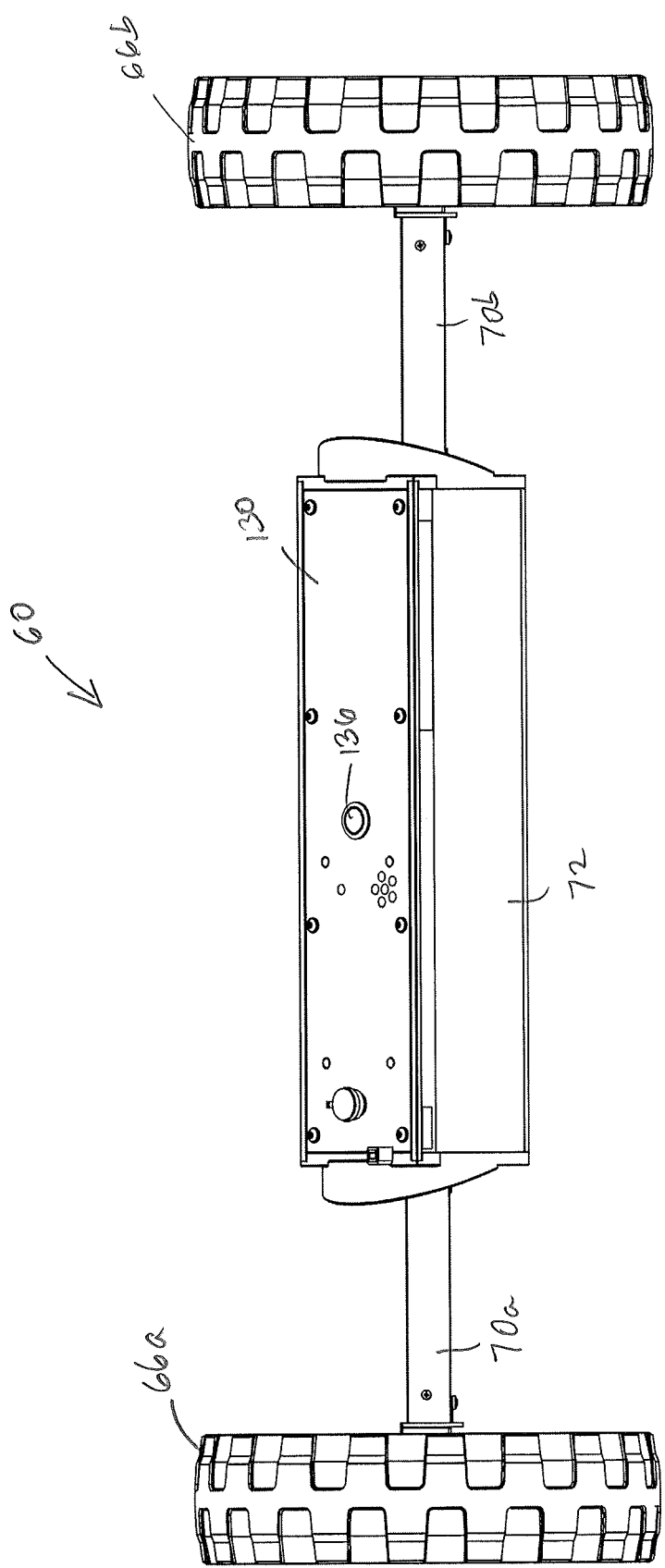
FIG. 4 is a rear elevation view of the golf cart drive unit illustrated in FIG. 1 in an expanded configuration.
Figure 5:
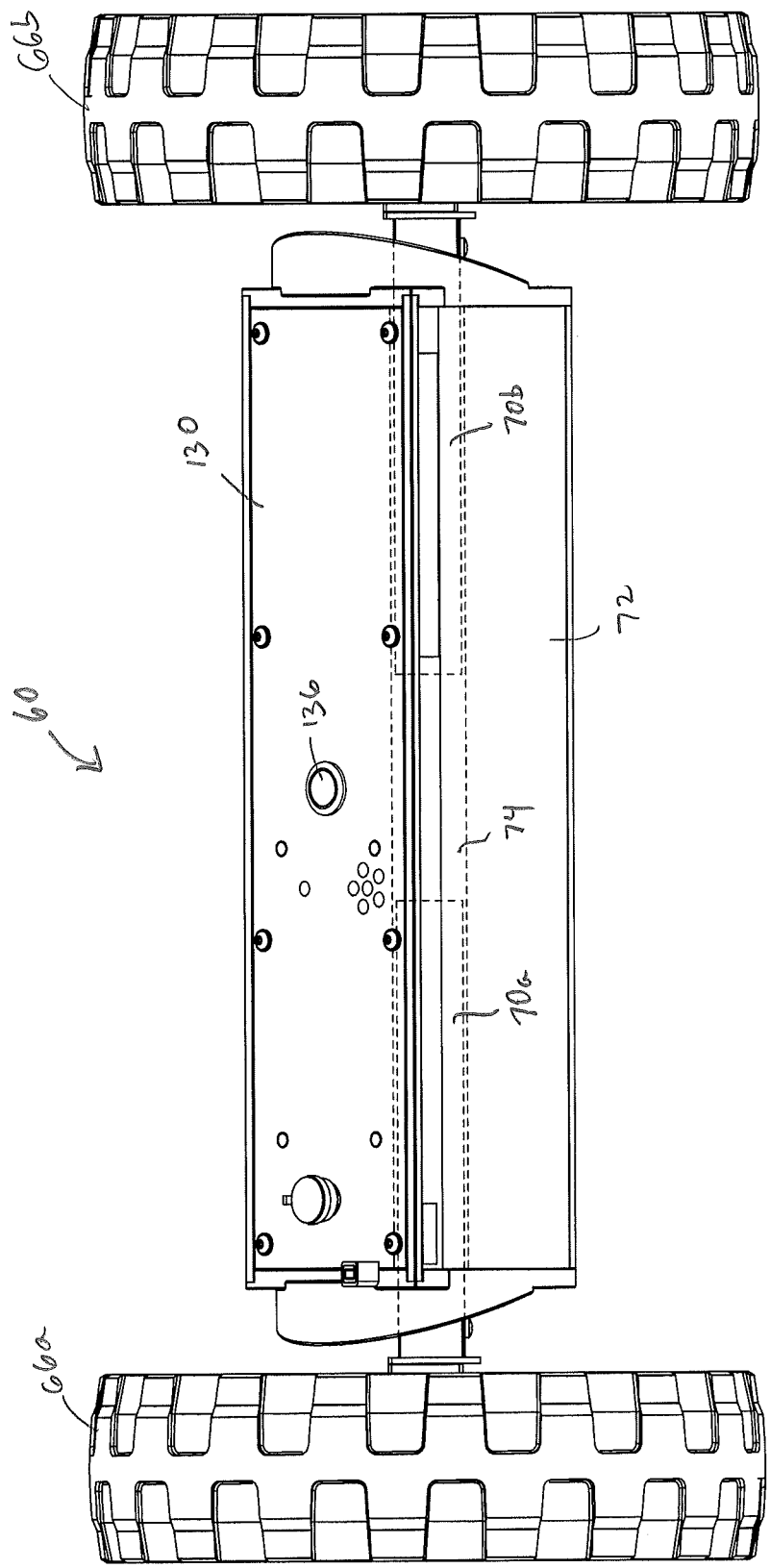
FIG. 5 is a rear elevation view of the golf cart drive unit of FIG. 4 in a compact configuration.
Figure 6:
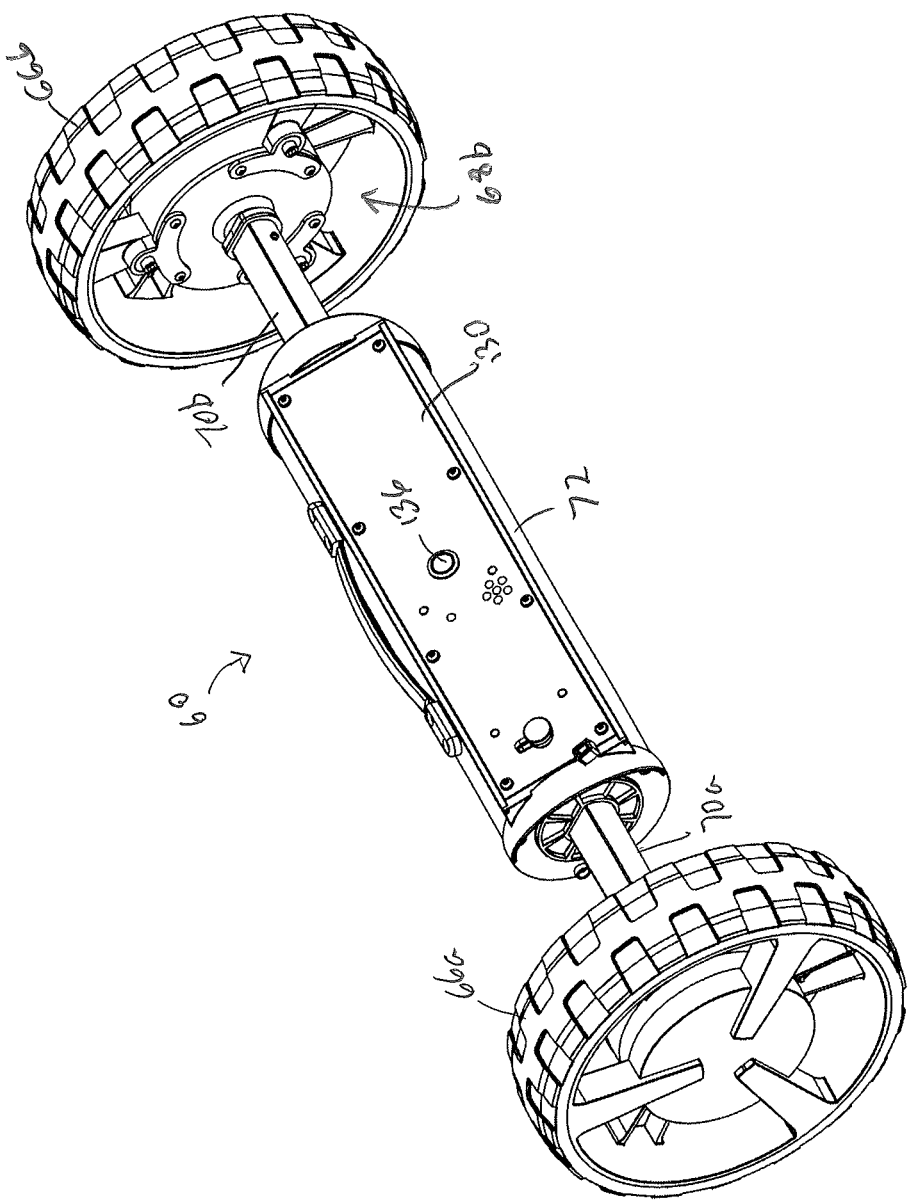
FIG. 6 is a perspective view of the golf cart drive unit of FIG. 4 in the expanded configuration.

Central control unit 72 has an internal channel 74 (shown in FIG. 5) which permits axles 70a and 70b to be manually retracted into control unit 72. Axles 70 can slide within internal channel 74 such that wheels 66 are spaced further apart as shown in FIG. 4 or are closer together as shown in FIG. 5. Channel 74 serves as an axle alignment member. Other structures that could serve as an axle alignment member include a sleeve (not shown) over the axles 70 or a spindle inserted into axles 70.

Figure 10:
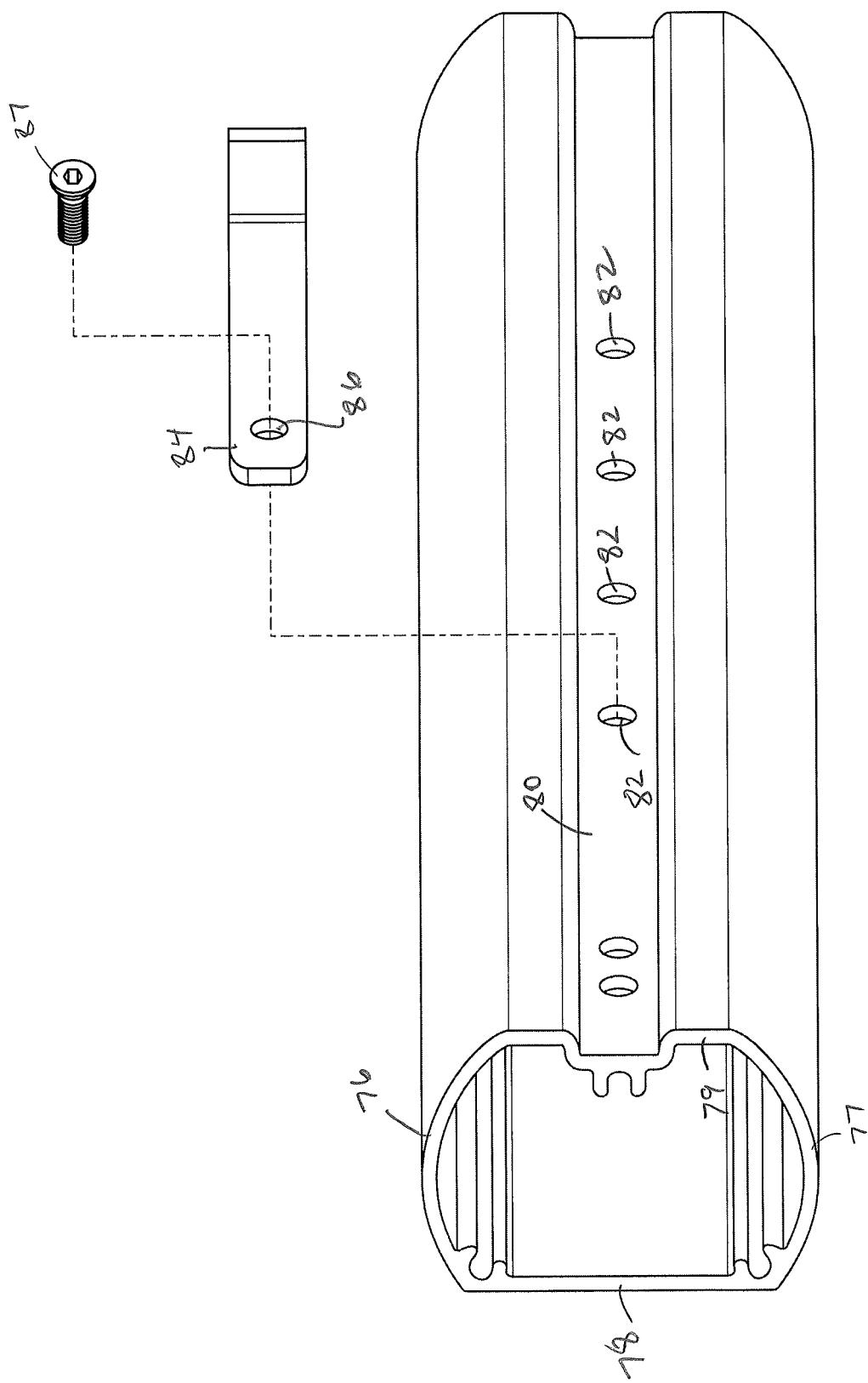
FIG. 10 is a perspective view of an axle of the golf cart drive unit of FIG. 4.
Figure 11:
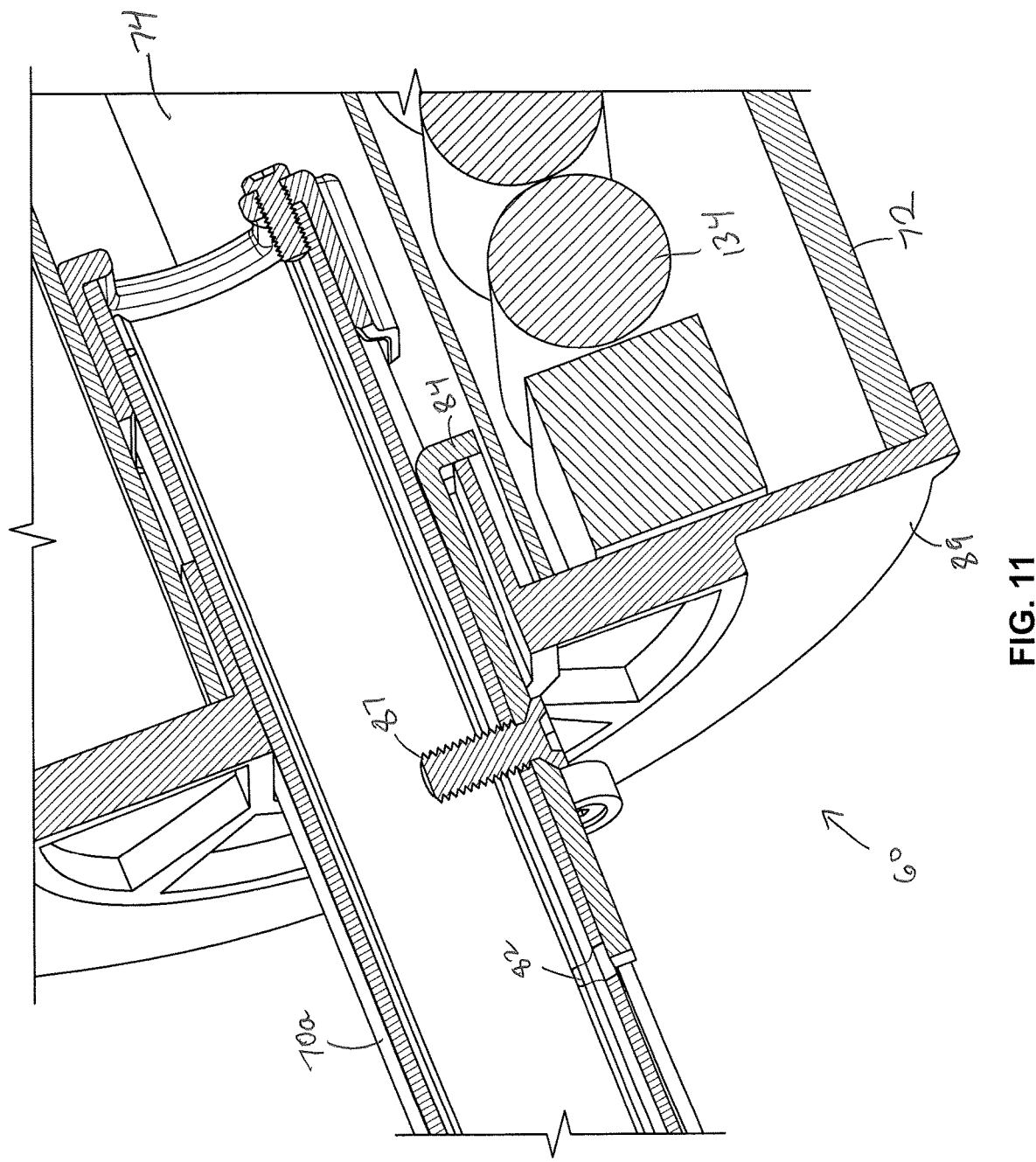
FIG. 11 is a cross-sectional view of the golf cart drive unit of FIG. 4.

Axles 70 may have any suitable profile or cross-section. As illustrated in FIG. 10, axle 70 has two opposed circular sidewalls 76 and 77, preferably having the same radius and center of curvature. Axle 70 has an upper wall 78 that is substantially flat or planar. Axle 70 has a lower wall 79 having a keyway 80 having a plurality of spaced openings 82, preferably equally spaced for attachment to a key 84 having an opening 86. A fastener 87, which may be, for example, a machine screw or bolt, can be used to attach key 84 in the keyway to axle 70 via opening 86 and one of openings 82 to set the distance between one of wheels 66*a* or 66*b* and control unit 72, and ultimately the distance between wheels 66*a* and 66*b*. Key 84 may be attached to control unit 72 by any suitable method. Specifically, key 84 can be attached to the outside of control unit 72 or as shown in FIG. 11, can extend into channel 74 behind an end cover 89 of control unit 72 thereby preventing further extension.

Figure 7:
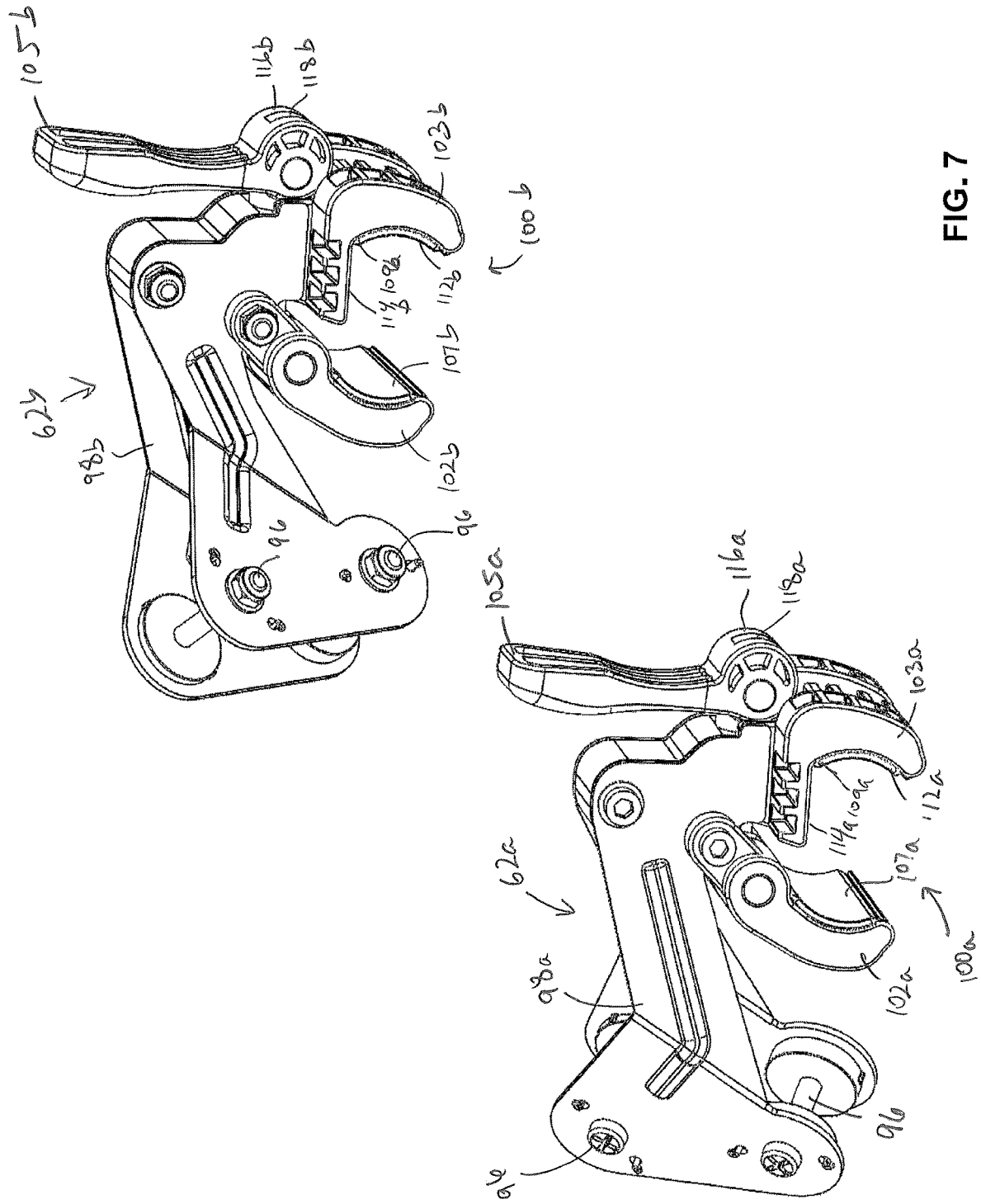
FIG. 7 a perspective view of two brackets illustrated in FIG. 1.
Figure 8:
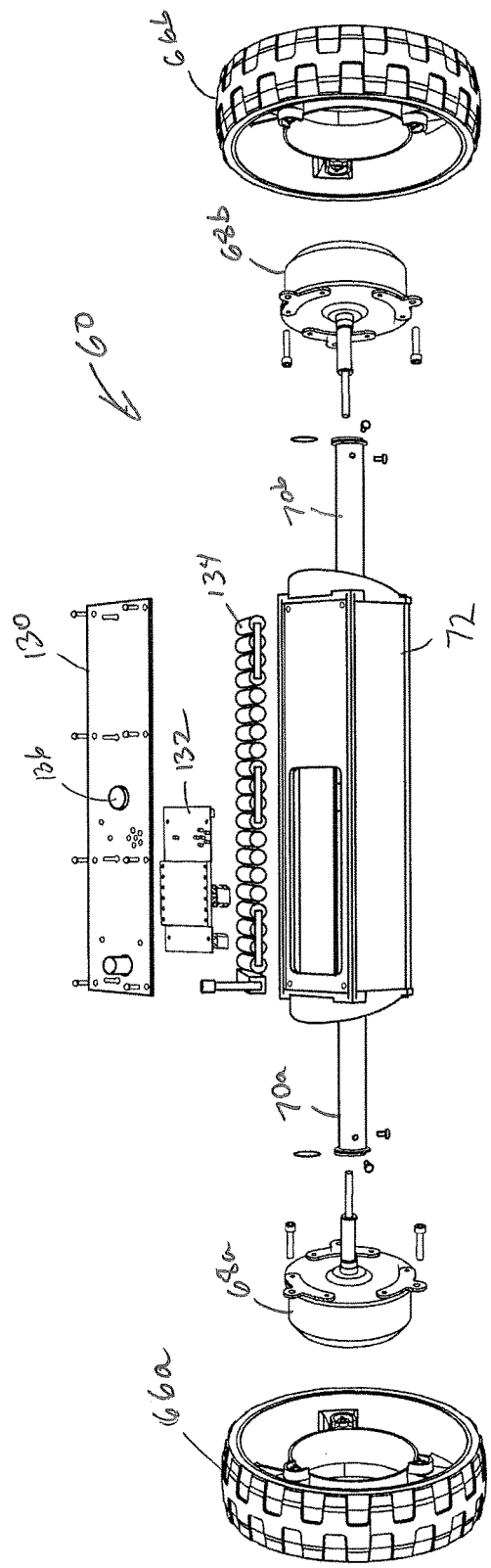
FIG. 8 is a partially exploded perspective view of the golf cart drive unit of FIG. 4.
Figure 9:
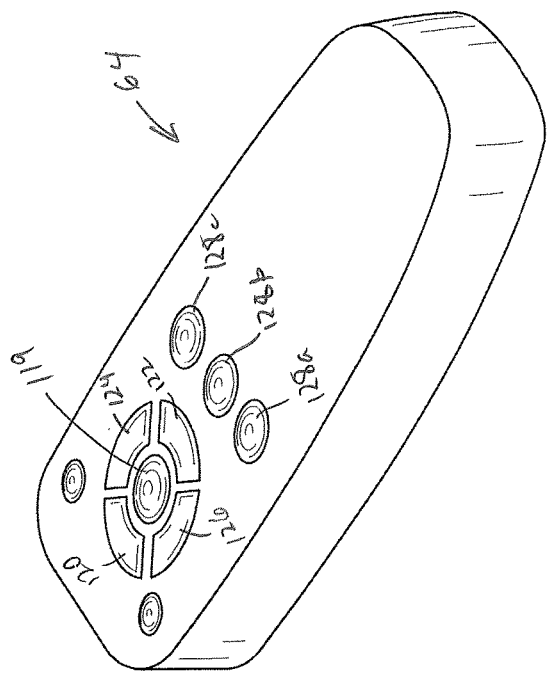
FIG. 9 is a perspective view of a remote control illustrated in FIG. 1.

Bracket 62 will now be discussed with reference to FIGS. 1, 3, and 7. Bracket 62 has opposed openings for attachment to frame 22 by fasteners 96. Fasteners 96 may be any suitable fastener including nuts and bolts. Bracket 62 has an angular body 98 and a clamp 100. Body 98 is angular because it is attached to frame members 30 and 32, which extend rearwardly and outwardly, and to axles 70, which are oriented in a sideways direction, substantially perpendicular to the forward-rearward direction. Body 98*a* may be a mirror image of body 98*b*. Clamps 100*a* and 100*b* can be substantially identical. Each clamp 100*a* and 100*b* has opposed jaws 102 and 103 and a lever 105 for closing and locking clamp 100 around one axle 70*a* or 70*b*. Jaw 102 has a curved clamping surface 107 matching sidewall 76. Jaw 103 has a clamping surface 109 having a curved portion 112 matching sidewall 77 and a flat portion 114 matching upper wall 78. Lever 105 may be designed to be "quick release" by having a cam surface 116 extending around a slot 118 for a fastener. Closing of lever 105 causes jaws 102 and 103 to close. Lever 105 is shown in an open position in FIGS. 3 and 7 in a closed position in FIG. 1.

Remote control 64 has a transmitter and receiver for wirelessly communicating with control unit 72 to operate and control golf bag cart 20. Remote control 64 has a plurality of user-selectable buttons for steering control unit 72 including a stop button 119, a forward button 120, a back button 122, a right turn button 124 and a left turn button 126. Gradual turns can be made by controller 64 making one wheel driven slightly faster or slower than the other, the slower wheel being the inboard wheel during such a turn. Remote control 64 also has a plurality of user-selectable buttons 128 for instructing control unit 72 to cause golf bag cart 20 to move forward a specified distance. For example, buttons 128*a*, 128*b*, and 128*c* may correspond to distances 15, 30 and 60 yards, respectively. Remote control 64 may be mounted suitably to handlebar 38 as in FIG. 1.

Turning back to central control unit 72, control unit 72 has a transmitter and receiver for wirelessly communicating with remote 64. Control unit 72 also has a console 130, a control board 132, and one or more rechargeable batteries 134. Advantageously and for a lower center of gravity, batteries 134 are located toward the bottom of control unit 72, because of their weight, and to facilitate orienting unit 60 in an upright position. Console 130 can have a variety of user-selectable controls such as various buttons similar to those previously described for remote control 64, for controlling the control unit 72 and including an on/off button and a port 136 for charging battery 134. Control board 132 is electrically connected to console 130, battery 134, and motors 68 by suitable wiring which is not illustrated. The wiring to motors 68 may include power conductors (a positive, a negative, and a ground) and conductors for Hall effect sensors. If motors 68 are located in wheels 66, the wiring may extend inside axles 70 and channel 74. Control board 132 may also have a motor controller for controlling motors 68, particularly if they are brushless, or perform those functions. Control board 132 can also monitor the rotation of the rotors and thereby measure the distance traveled in response to selection of one of buttons 128. Control board 132 can also selectively advance one of motors 68*a* or 68*b*, but not the other (or not as fast), to turn cart 20 right or left in response to selection of button 124 or button 126. As one of skill in the art can appreciate, cart 20 is easy to control.

Transportation of a golf bag and golf bag cart 20 from a golf course after a round of golf, for example, will now be discussed. The golf bag is removed from the cradle. Next levers 105 are flipped up quickly releasing axles 70 from clamps 100. Drive unit 60 can then be removed from cart 20, optionally made more compact by pushing wheels 66 inwardly and placed in the vehicle trunk. With the removal of drive unit 60, full collapse of frame 22 is possible. Releases (not shown) are pulled allowing cart frame 22 to be folded at pivots 26 and 28 into a highly compact configuration that is not possible until drive unit 60 is removed. Frame 22 may then be put in the vehicle trunk. As can be seen, golf bag cart 20 with drive unit 60 allows for an easy collapse of cart 20. The separation of frame 22 from drive unit 60 means that the two can be placed in a car easily by having a manageable weight and size. Advantageously, frame 22 of golf bag cart 50 may be purchased separately from drive unit 60. Indeed frame 22 may already be owned by a golfer for many years before purchase of drive unit 60. The easy removal of drive unit 60 allows frame 22 to be collapsed easily in accordance with the intent of the manufacturer of frame 22.

Similarly, reassembly is also easy. Drive unit 60 is removed from the trunk and optionally expanded by pushing wheels 66 apart until key 84 contacts end cover 89. Frame 22 is removed from the trunk and unfolded in accordance with its manufacturer's design. Clamps 100 are placed onto axles 70. Flat portion 114 of clamp 100 sits on upper wall 78 supporting the weight of cart frame 22. Next levers 105 are flipped down to close and lock clamps 100 over axles 70. This closure is easy because the weight of cart 20 is supported and the closure of clamp 100 is not opposed by the weight of cart 20. If axles 70 rotate because motors 68 are located inside control unit 72, clamps 100 are placed on sleeves around axles 70. Next the bag is placed inside cradle 36 and secured. As can be seen, cart 20 is easily transported, reassembled and disassembled.

In another aspect of the invention, a method of motorizing a golf bag cart is presented with respect to golf cart 50 and drive unit 60. First, rear wheels 52 are removed from golf cart 50 by removing the fasteners connecting rear wheel assemblies to outwardly extending frame members 30 and 32. Next brackets 62 are fastened to frame members 30 and 32. Drive unit 60 is advantageously sold in its compact configuration to save on transportation costs. Fastener 87 is removed, allowing axle 70 to slide out. The user moves both wheels equally outwards sufficiently wide to allow clamps 100*a* and 100*b* to be clamped to axles 70*a* and 70*b* respectively while aligning opening 86 of key 84 with one of openings 82 in keyway 80. Key 84 is then reattached to keyway 80 with fastener 87 to set the maximum length of axle 70 outside control unit 72. Next, frame 22 is connected to drive unit 60 by placing clamps 100*a* and 100*b* onto axles 70*a* and 70*b* respectively and levers 105 flipped down to close and lock clamps 100*a* and 100*b* over respective axles 70*a* and 70*b*.

In another aspect of the invention, a golf bag drive kit is provided. The kit is adapted to motorize a golf cart, such as golf cart 50. The kit comprises brackets 62, remote control 64, and drive unit 60, which includes wheels 66*a* and 66*b*, motors 68*a* and 68*b*, axles 70*a* and 70*b*, central control unit 72 and clamps 100*a* and 100*b* as previously described.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A golf bag drive kit for propelling a golf bag cart comprising (1) a frame, (2) a cradle adapted to hold a golf bag for containing a set of golf clubs, the cradle attached to the frame, (3) a front wheel attached to the frame, the golf cart drive kit comprising a golf cart drive unit comprising:
   first and second axles having first and second axes, respectively;
   first and second opposed wheels rotatable around the first and second axes, respectively;
   a first electrical motor for driving the first opposed wheel and having a first rotor rotatable around the first axis;
   a second electrical motor for driving the second opposed wheel and having a second rotor rotatable around the second axis; and
   an alignment member attached to the first and second axles and located between the first and second wheels, the alignment member aligning the first and second axles and comprising a channel into which the first and second axles extend allowing the first and second wheels to be pushed together for making the drive unit compact for transportation and allowing the first and second wheels to be spread apart for attachment to the frame.

2. The golf bag drive kit of claim 1 further comprising a housing containing the channel, a battery in the housing and wiring electrically connected to the first and second motors for supplying electrical power from the battery, the wiring extending within the first and second axles and within the channel.

3. The golf bag drive kit of claim 1 wherein the first axle comprises a keyway along a length of the axle, the keyway having a plurality of openings spaced along a length of the keyway.

4. The golf bag drive kit of claim 3 further comprising a key having an opening and substantially matching the keyway, the key and keyway being fastenable by a fastener passing through the key opening and one of the keyway openings.

5. The golf bag drive kit of claim 1 herein the golf cart drive unit is capable of steering the golf bag cart by differential rotation of the first and second wheels by the first and second motors, respectively.

6. The golf bag drive kit of claim 1 further comprising a first bracket for attachment to the frame and to the first axle and comprising opposed clamping surfaces and the first axle having two clamping surfaces to which the bracket attaches, the bracket clamping surfaces substantially matching the first axle clamping surface.

7. The golf bag drive kit of claim 6 wherein the at least one of the first axle clamping surfaces comprises a non-circular portion.

8. The golf bag drive kit of claim 1 wherein the first and second motors are in the first and second wheels, respectively.

9. A motorized golf bag cart comprising:
   a golf bag cart comprising (1) a frame, (2) a cradle adapted to hold a golf bag for golf clubs or irons, the cradle attached to the frame, and (3) a front wheel attached to the frame;
   a golf cart drive unit comprising (1) first and second axles having first and second axes, respectively, and are attached to the frame, (2) first and second opposed wheels rotatable around the first and second axes, respectively, (3) a first electrical motor for driving the first wheel and having a first rotor rotatable around the first axis, (4) a second electrical motor for driving the second wheel and having a second rotor rotatable around the second axis, and (5) an alignment member attached to the first and second axles and located between the first and second wheels, the alignment member aligning the first and second axles; and
   a control for instructing the golf cart drive unit to move the golf bag cart forward a distance selected at the control, wherein each of the first and second motors comprises a rotor and a plurality of Hall effect sensors for sensing the rotation of the rotor, wherein the unit determines a distance traveled by the rotation of the rotors sensed by the Hall effect sensors.

10. The golf bag cart of claim 9 wherein the first and second motors are in the first and second wheels, respectively.

11. The golf bag cart of claim 10 further comprising first and second brackets attached to the frame and comprising opposed clamping surfaces, the first and second brackets attached to the respective first and second axles, each of the first and second axles having two clamping surfaces to which the respective bracket attaches, the bracket clamping surfaces substantially matching the respective axle clamping surfaces.

12. The golf bag cart of claim 11 wherein the at least one of the first axle clamping surfaces comprises a non-circular portion.

13. A method of motorizing a golf bag cart comprising (1) a frame, (2) a cradle adapted to hold a golf bag for golf clubs or irons, the cradle attached to the frame, and (3) a front wheel attached to the frame, the method comprising:
    attaching first and second brackets to the frame;
    attaching a golf cart drive unit to the cart to the first and second brackets, the golf cart drive unit comprising (1) first and second axles having first and second axes, respectively, (2) first and second opposed wheels rotatable around the first and second axes, respectively, (3) a first electrical motor for driving the first wheel and having a first rotor rotatable around the first axis, (4) a second electrical motor for driving the second wheel and having a second rotor rotatable around the second axis, and (5) an alignment member attached to the first and second axles and located between the first and second wheels, the alignment member aligning the first and second axles; and
    sliding the first and second axles outwardly relative to the alignment member so that the first and second wheels are spaced outwardly of the first and second brackets, respectively.

14. The method of claim 13, wherein the frame further comprises mounting holes for attaching two non-motorized rear wheels when the cart is non-motorized, wherein the attaching first and second brackets comprises fastening the first and second brackets to the frame by the mounting holes.

15. The method of claim 14 further comprising detaching the non-motorized rear wheels from the cart before the fastening of the first and second brackets.

16. The method of claim 14 wherein the attaching of the golf cart drive unit comprises attaching the first and second axles to the first and second brackets.

17. A golf bag drive kit for propelling a golf bag cart comprising (1) a frame, (2) a cradle adapted to hold a golf bag for containing a set of golf clubs, the cradle attached to the frame, (3) a front wheel attached to the frame, the golf cart drive kit comprising a golf cart drive unit comprising:
   first and second axles having first and second axes, respectively;
   first and second opposed wheels rotatable around the first and second axes, respectively;
   a first electrical motor for driving the first wheel and having a first rotor rotatable around the first axis;
   a second electrical motor for driving the second wheel and having a second rotor rotatable around the second axis;
   an alignment member attached to the first and second axles and located between the first and second wheels, the alignment member aligning the first and second axles; wherein the golf cart drive unit is capable of steering the golf bag cart by making one of the first and second wheels turn faster than the other motor; and
   a housing between the first and second opposed wheels and one or more batteries located within a lower portion of the housing to orient the golf cart drive unit in an upright position by gravity.

18. A golf bag drive kit for propelling a golf bag cart comprising (1) a frame; (2) a cradle adapted to hold a golf bag for containing a set of golf clubs, the cradle attached to the frame, (3) a front wheel attached to the frame, the golf cart drive kit comprising a golf cart drive unit comprising:
   first and second axles having first and second axes, respectively;
   first and second opposed wheels rotatable around the first and second axes, respectively;
   a first electrical motor for driving the first wheel and having a first rotor rotatable around the first axis;
   a second electrical motor for driving the second wheel and having a second rotor rotatable around the second axis; and
   an alignment member attached to the first and second axles and located between the first and second wheels, the alignment member aligning the first and second axles; wherein the golf cart drive unit is capable of steering the golf bag cart by the first and second motors differentially rotating the first and second wheels.

* * * * *